(No Model.) 2 Sheets—Sheet 1.
B. DEARDORFF.
CORN PLANTER.
No. 512,646. Patented Jan. 9, 1894.
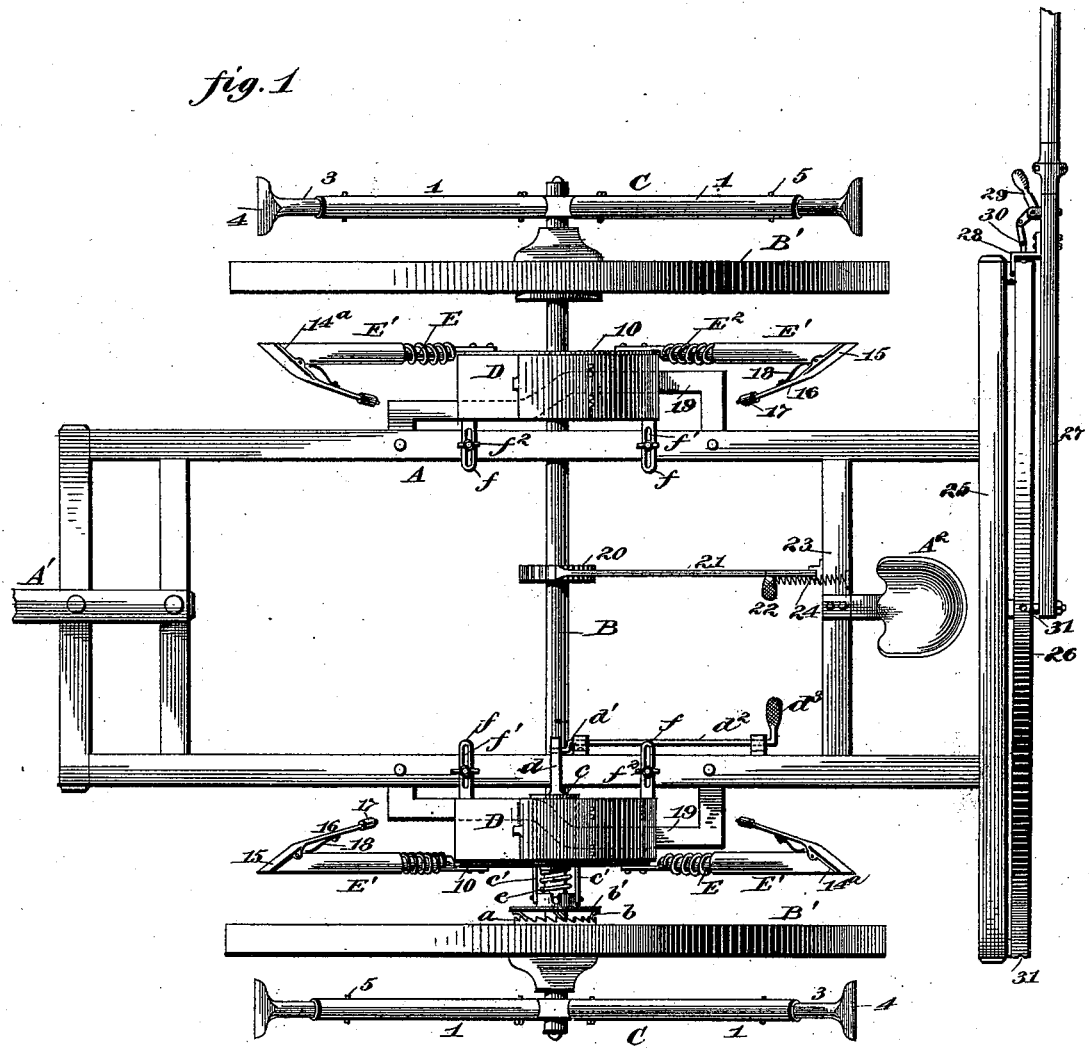
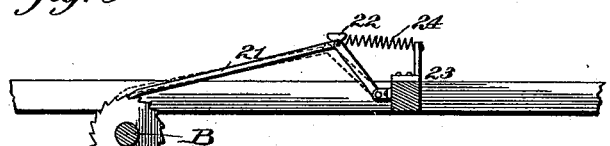
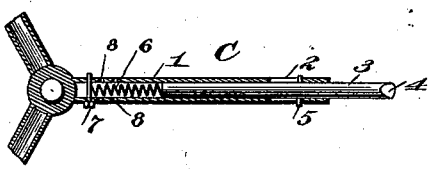
Witnesses.
J. F. Coleman
G. F. Downing
Inventor
Benton Deardorff.
By H. A. Seymour
his Atty.

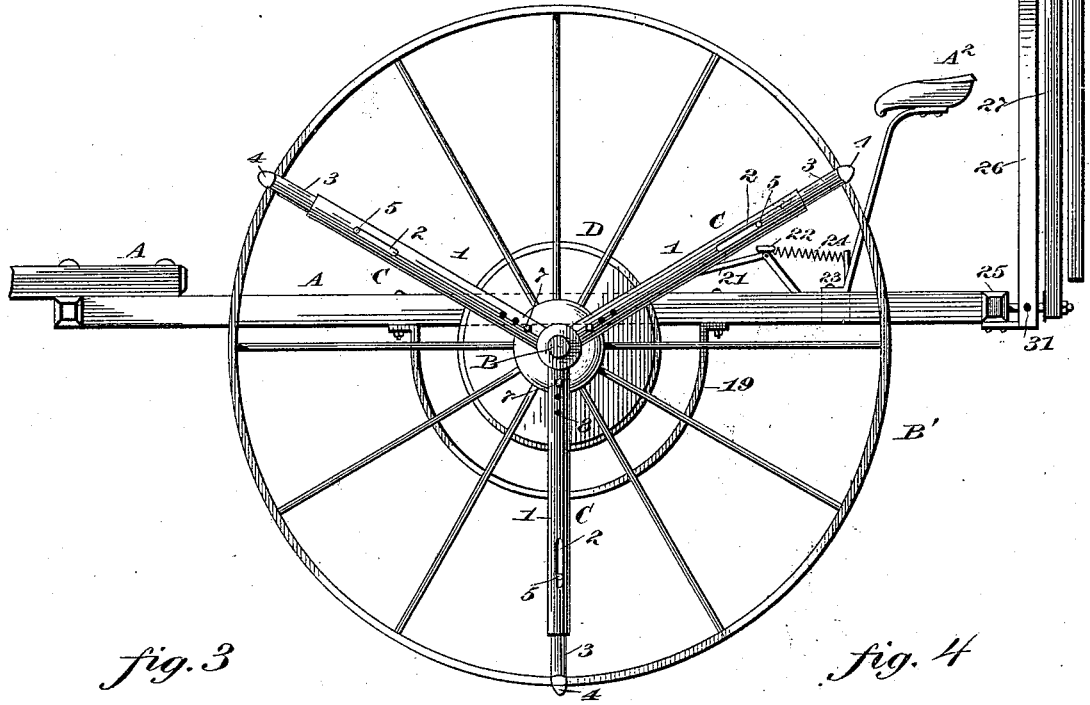

UNITED STATES PATENT OFFICE.

BENTON DEARDORFF, OF MOORELAND, ASSIGNOR OF ONE-HALF TO JOHN W. DICK, OF HAGERSTOWN, INDIANA.

CORN-PLANTER.

SPECIFICATION forming part of Letters Patent No. 512,646, dated January 9, 1894.

Application filed December 28, 1892. Serial No. 456,530. (No model.)

*To all whom it may concern:*

Be it known that I, BENTON DEARDORFF, a citizen of Mooreland, in the county of Henry and State of Indiana, have invented certain new and useful Improvements in Corn-Planters; and I do hereby declare the following to be a full, clear, and exact description of the invention, such as will enable others skilled in the art to which it appertains to make and use the same.

My invention relates to an improvement in corn planters and more particularly to such as are known as check row planters,—the object of the invention being to construct a corn planter in such manner as to do away with shovels or other devices adapted to drag in the ground and also to do away with a number of levers and also to do away with drive chains.

A further object is to produce a corn planter which shall be simple and practical in construction, and effectual in the performance of its functions.

With these objects in view the invention consists in certain novel features of construction and combinations and arrangements of parts as hereinafter set forth and pointed out in the claims.

In the accompanying drawings: Figure 1 is a plan view of the device. Fig. 2 is a view in side elevation. Fig. 3 is an enlarged view of the seed box and attached tube or chute, the latter being in section and portions of the former being broken away. Fig. 4 is a similar view taken at right angles to the view shown in Fig. 3. Fig. 5 is an enlarged detail in section showing wheel 20, lever 21 and connected parts. Fig. 6 is an enlarged detail in section of a portion of tubes C. Fig. 7 is an enlarged detail of the clutch.

A represents the frame of the machine, to one end of which a tongue A' is attached and on the other end of which a driver's seat $A^2$ is located. An axle B is mounted in suitable bearings at or near the center of the frame A and extends some distance laterally from each side of said frame the ends being supported in carrying wheels B'. The hub of one of the wheels B' is provided with a ratchet wheel or disk $a$, with which a series of (preferably four) dogs $b$ carried by a disk $b'$, are adapted to engage when it is desired to have the axle rotate with the wheels. The disk $b'$ is adapted to rotate with the axle B and to have a sliding movement thereon so that the dogs $b$ carried thereby can be moved into and out of mesh with the ratchet wheel or disk $a$. A sleeve $c$ is loosely mounted on the axle B and adapted to have a sliding movement thereon, said sleeve being connected with the disk $b'$ carrying the dogs $b$, by means of rods $c'$. A sliding bar $d$ is mounted on the frame A and is connected at one end with the sleeve $c$, and to the other end of said sliding bar the crank arm $d'$ of a crank shaft $d^2$ is attached. The crank shaft $d^2$ is mounted in suitable bearings on the frame A and at its inner end in proximity to the driver's seat $A^2$ is provided with a foot treadle or lever $d^3$. By pressing on this foot lever the dogs carried by the disk $b'$ can be moved out of mesh with the ratchet wheel or disk $a$. Said dogs $b$ will be maintained normally in mesh with the ratchet wheel or disk by means of a spring $e$ encircling the axle B, said spring bearing at one end against the disk $b'$ and at the other end against a collar $e'$ on the axle B.

On each end of the axle A a series of (preferably three) markers C are secured. Each marker C comprises a tube 1 having an elongated slot 2 therein and a shaft 3 having a marking tooth or finger 4 at its outer end. The shaft 3 is fitted loosely in the tube 1 and is provided with a pin 5 which projects into the elongated slot 2 in the tube and thus limits the movement of said shaft. A coiled spring 6 is inserted in the tube under the shaft 3, said spring bearing at one end against the end of the shaft and at the other end on a pin 7 passing through perforations in the tube. Several perforations 8 are made in the tube whereby the pin 7 may be adjusted and to provide for the regulation of the tension of the spring 6.

A seed box D (preferably circular in form), surrounds the axle B, at each side of the machine, and is supported by the frame A by means of arms $f$, said arms being provided with elongated slots $f'$ for the reception of set screws $f^2$, whereby the seed box can be adjusted for a purpose hereinafter explained.

While a seed box and dropping devices will be provided at each side of the machine, I will, for sake of convenience, describe but one set of these devices.

Secured to the axle B and provided with openings for the accommodation of the rods $c'$ of the clutch mechanism and the collar $e'$, is a circular plate 10. A circular band 11 is secured to the circular plate 10 and provided with openings 12, which openings are equal in number and coincident with a series of tubes or chutes E secured to the circular plate 10. In planting corn I prefer to employ three tubes or chutes E at each side of the machine,—that is to say, one tube or chute to correspond with each marker at each side of the machine,—but in drilling I prefer to employ a greater number of tubes or chutes and also to employ a circular band 11 having a greater number of openings 12. When it is desired to employ a band having a greater number of openings it is simply necessary to move the seed box inwardly, remove the band 11 and replace it by another.

The seed box D is so disposed as to encircle the band 11, and in its bottom is provided with a (preferably square) opening 13, over which a valve 14 projects and between this valve and the inner wall of the seed box the band 11 is adapted to rotate, the valve serving to prevent the too rapid discharge of the seed from the box. When the openings 12 in the band 11 become coincident with the opening 13 in the seed box, the seed will pass through said openings and enter the tube or chute in line therewith. The spring valve 14 is made T-shaped, having a spring arm $f^{10}$ and arms $f^{11}, f^{12}$ lying coincident with the band 11. The arm $f^{11}$ is adapted to prevent the entrance of more than one seed at a time in each hole 12 in the band 11, and the arm $f^{12}$ is provided with a tooth $f^{13}$ adapted to insure the passage of the seed through the opening 13 in the seed box.

Encircling each tube or chute E is an outlet or discharge pipe or chute E', said chutes E, E' being adapted to telescope with each other. A spring $E^2$ encircles each tube or chute E, said spring bearing at one end against a pin $13^a$ passing through the chute E, and at the other end connected with the outlet tube or chute E'. The free end of each outlet or discharge chute E' is beveled so as to produce a pointed end $14^a$ adapted to enter the ground when the machine is in operation, said beveled discharge end being normally covered by a gate 15. Each gate 15 is provided with an arm 16, on the free end of which a roller 17 is journaled. A spring 18 is secured at one end to said arms 16 and at the other end adapted to bear against the discharge tube E', whereby to maintain the gate 15 normally closed. A plate 19 is secured to the frame A and projects below the seed box D. The roller 17 carried by the arms 16 of the gates 15, is adapted to engage the plate 19 when said chutes assume the proper position to discharge the grain, whereupon the gate 15 of the downwardly projecting chute will be opened to permit the escape of the grain into the ground.

A ratchet wheel 20 is secured to the axle B, at a point between its ends, and is adapted to be engaged by a rod 21. The other end of the rod 21 is pivotally connected to a foot lever 22, the latter being pivotally connected to a post 23 secured to the frame A. By pressing on the foot lever the axle may be rotated when the markers get too far ahead, or, in other words, when the markers rotate too fast and fail to mark the ground in line with the last row of marks. The lever 22 and rod 21 will be maintained in their normal positions by means of a spring 24 secured at one end to said foot lever and at the other end to the post 23.

At the rear end of the frame A, is a cross bar 25 adapted to project at its ends laterally from said frame A. To this cross bar a semi-circular plate 26 is secured and adapted to extend from one end of said cross bar to the other. A gage 27 is pivotally connected at its inner end to the center of the cross bar 25, said gage being preferably made in two sections hinged together. The gage 27 is provided with a hook-shaped bracket 28 adapted to project parallel with the inner edge of the semi-circular plate 26 and thus insure the proper relation of said gage to the semi-circular plate. A bell crank lever 29 is pivotally connected to the gage 27. The bell crank lever constitutes an operating lever for a latch bar 30 connected to the short arm thereof. The latch bar 30 is adapted to enter perforations 31 in the semi-circular plate 26 and serves to retain the gage in the position to which it is placed. When the gage is not in use it will be folded and disposed in an upright position, and retained in such position by the latch bar 30 entering the perforation 31 at the center of the semi-circular plate 26.

Having fully described my invention, what I claim as new, and desire to secure by Letters Patent, is—

1. In a corn planter, the combination with a revoluble axle, of markers carried by the axle, said markers comprising tubes and slide shafts in the tubes, and means for limiting the outward slide of the shafts, springs bearing outwardly upon the shafts, said tubes provided with two or more holes, and pins adapted to be inserted in one of the holes of each tube to regulate the tension of the connected spring, substantially as set forth.

2. In a corn planter, the combination with a revoluble shaft, of markers consisting of a series of radiating tubes, said tubes each having a series of holes at or near the inner end, a slide shaft in each tube, a removable pin adapted to be inserted in one of the holes, a spiral spring interposed between the pin and shaft, and means for limiting the sliding movement of the shafts, substantially as set forth.

3. In a corn planter, the combination with a frame, axle, wheels and feeding devices, of markers carried by the axle, each marker comprising a tube having an elongated slot therein, a shaft in said tube, a pin projecting from said shaft and adapted to enter said elongated slot, said tube also having a series of perforations at its inner end, a pin adapted to pass through said perforations, and a spring inserted between the inner end of the shaft and said pin, substantially as set forth.

4. In a corn planter, the combination with a frame, axle wheels and feeding devices, of markers carried by the axle, each marker comprising a tube, having an elongated slot, a shaft in said tube, a pin projecting from said shaft and entering said elongated slot, a spring under said shaft and means for adjusting the tension of said spring, substantially as set forth.

5. In a corn planter, the combination with a frame axle and wheels, of a ratchet wheel or disk carried by the hub of one of the wheels, a disk adapted to have a sliding movement on said axle and rotate therewith, dogs carried by said disk and adapted to engage said ratchet disk or wheel, a spring adapted to maintain said dogs normally in engagement with said ratchet disk or wheel, rods connected at one end with the disk carrying the dogs, a sliding collar to which the other ends of said rods are attached, a sliding bar connected with said collar, a rocking crank shaft connected with said sliding bar, said crank shaft extending at right angles to the sliding bar and adapted to rock in the same direction that said bar slides and a foot lever projecting from said crank shaft, substantially as and for the purpose set forth.

6. In a corn planter, the combination with a frame, axle, and wheels carried by the axle, of a seed box carried by the frame and encircling the axle, said seed box having an outlet in its bottom, a ring adapted to turn in the box and provided with holes and feed chutes adapted to rotate with the axle and ring and receive grain through the holes in the rings, substantially as set forth.

7. In a corn planter, the combination with a frame, axle, and wheels carried by said axle, of a circular seed box adjustably secured to the frame and having an outlet opening, a ring fitted inside of the box and adapted to turn therein with the axle and feed chutes carried by the ring and adapted to receive grain from said seed box,—substantially as set forth.

8. In a corn planter, the combination with a frame, axle and wheels carried by said axle, of a circular seed box carried by the frame and surrounding the axle, a valved outlet in the bottom part of said seed box a rotary ring in the box, between the wall of the box and the valve and chutes carried by the ring and adapted to receive grain from said seed box, substantially as set forth.

9. In a corn planter, the combination with a frame, axle and wheels carried by said axle, of a seed box carried by the frame and surrounding the axle, said seed box having an outlet for grain, a plate carried by the axle, a band carried by said plate and having a series of openings therein adapted to align successively with the outlet of the seed box, a valve between which and the wall of the seed box, the band turns and a series of feed chutes carried by said plate and adapted to align with the openings in said band, substantially as set forth.

10. In a check row corn planter, the combination with a frame, axle and markers secured to the axle, of a ratchet wheel secured to the axle, a pair of levers pivoted together, the free end of one adapted to bear on the ratchet wheel and the other lever pivoted to the frame, and a spring for rearwardly throwing the connected ends of the levers upward, substantially as set forth.

11. In a corn planter, the combination with a frame, axle and wheels carried by the axle, of a seed box carried by the frame, and having an outlet therein, a band adapted to rotate in said box and having openings therein adapted to align successively with the outlet of the seed box, and a spring valve secured to the seed box and adapted to project over said band at a point coincident with the outlet of the seed box, said valve having an arm adapted to prevent the entrance of more than one seed at a time in each hole in the band, and said valve also having an arm provided with a tooth adapted to insure the passage of the seed through the outlet of the seed box, substantially as set forth.

In testimony whereof I have signed this specification in the presence of two subscribing witnesses.

BENTON DEARDORFF.

Witnesses:
   THOS. DEARDORFF,
   ISRAEL DEARDORFF.